March 28, 1939.                E. BUGATTI                2,151,833
                           BALL AND SOCKET JOINT
                           Filed Dec. 8, 1936.
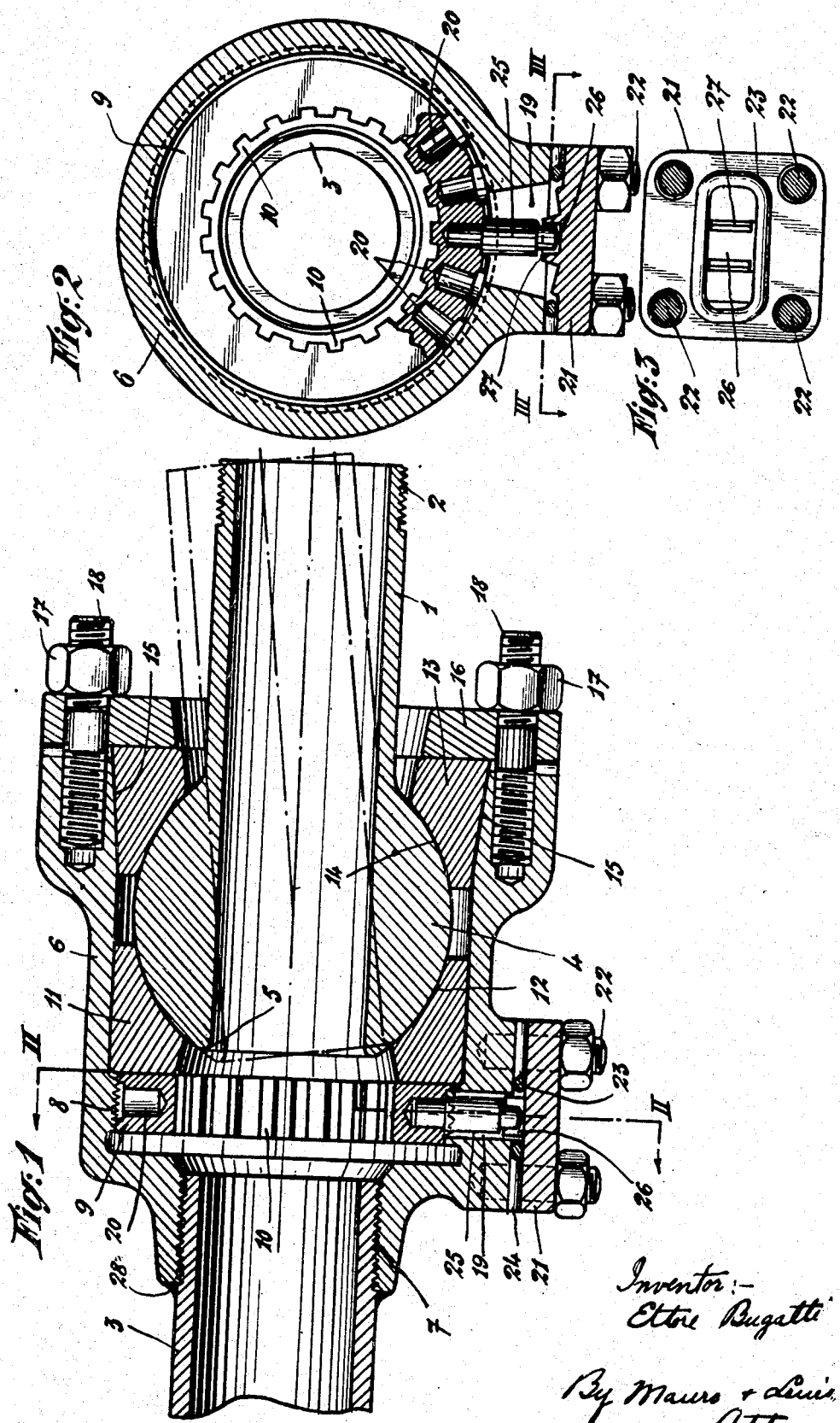

Patented Mar. 28, 1939

2,151,833

UNITED STATES PATENT OFFICE 2,151,833

BALL AND SOCKET JOINT

Ettore Bugatti, Molsheim, France

Application December 8, 1936, Serial No. 114,851
In France December 21, 1935

2 Claims. (Cl. 285—94)

The present invention concerns a swivel assembly device intended to be interposed between two elements capable of occupying a variable angular position with respect to each other. These elements are, for instance, two parts of a system of pipes or conduits for conveying any fluid the temperature or the pressure of which may be different from normal temperature and pressure.

The object of the present invention is to provide an assembly device in which the parts which are in frictional engagement with one another are applied against one another under the action of a suitable pressure, which is adjustable and uniform, especially with a view to taking up the play that may occur. Another object of the invention is to provide a joint between pipes or pipe elements for conveying a fluid, which are liable to be displaced with respect to each other, this joint being adapted to ensure the desired fluid tightness.

The assembly device according to the present invention includes a ball movable in a socket consisting of at least two parts mounted inside a support. An essential feature of the assembly device according to the present invention lies in the fact that a ring-shaped portion of the socket which surrounds the ball, or several portions of said socket, for instance segments the combination of which constitutes this ring-shaped element, cooperate with tightening means including inclined or conical surfaces devised in such manner that said ring-shaped element is both applied against the ball and shrunk thereon. When this ring-shaped element is a one part member it may be of a plastic nature or else it must be provided with one or several slots, whereby it can be caused to shrink on the ball element. The other part or parts of the socket, when they are not mounted in the same manner as the first one, may bear directly against the support.

The tightening means may consist of a series of wedges which are adapted to be forced between the ball element and its support. The inclined surfaces may be provided on the support, on the ring shaped element or on both. The wedges are for instance in contact with an annular element applied against them and pushing them simultaneously when it is screwed or bolted on the support. In a simplified embodiment of the invention, the inclined surfaces are provided on the support and on the ring-shaped element, or on intermediate parts connected with said ring-shaped element or with the segments of which it is composed, said ring-shaped element or said segments or said intermediate parts being subjected to the action of the annular element above mentioned.

In the preferred embodiment of the invention, the support further includes an adjustable stop or backing member against which the other part of the socket, or the other parts, or again some of them, are adapted to bear. This adjustable stop advantageously consists of a threaded plate, a nut, or the like, or more generally any member with central fixation and tightening, that is to say a member which is screwed in the support by rotation about an axis passing through the center of the swivel joint in such manner that the pressure that is exerted is uniformly distributed over the corresponding part or parts of the socket.

When the support surrounding the socket elements is a closed case connected with one of the parts of the system which are to be assembled by the joint, the adjustable stop advantageously consists of an end plate screwed in the said case and the case has an aperture or slot for passing a tool or other driving device to engage the plate and move the same for adjustment purposes, for instance through holes at close intervals in the periphery of said plate. A suitable brake may be associated with this plate for stopping it in the desired adjustment position. Advantageously, means are provided for closing or sealing the above mentioned aperture after adjustment of the backing member. The insertion of the plate inside the case is effected for instance with a spanner provided with pointed elements, a tool having a polygonal end, etc. If the assembly device is intended to interconnect pipes or portions of pipes for a fluid, the plate is provided with a central hole the edge of which may be castellated so as to facilitate the insertion of said plate by means of a tool engaging in the notches of said castellated edge.

When the assembly device according to the invention serves to interconnect two fluid pipe elements, one of these pipe elements may carry a hollow ball, open on the side of the other pipe element, whereas the latter carries a socket the mouth of which is in the shape of a frustum of a cone. At the end of this socket, there is screwed a backing ring or perforated plate adjustable from the outside as above explained. Against this ring is located a packing piece in the shape of a ring. This packing ring is preferably made of a material having a certain degree of elasticity and/or plasticity or compressibility. For instance it will be made of one of the materials usually employed in stuffing boxes, such as compressed asbestos. If desired it will be metallic. The ball element is applied against said end ring element by another ring-shaped element engaging the flaring portion of the socket. This last mentioned ring-shaped element, which may also serve to ensure fluid tightness, is preferably of the same nature as the first one. However it may consist of a slotted metallic ring or a series of metallic segments, in which case, the ends of the metallic rings or the respective adjoining surfaces of the segments must be assembled in the manner of labyrinth packings. This last mentioned ring element is pushed in its housing by a ring which is screwed or bolted on the socket. Owing to its conical bearing surface, it ensures a fluid tightness which cannot be obtained with a cylindrical bearing surface, especially in the case of packings made of a material which is little compressible, as it is required in the case of high pressures, high temperatures, or corrosive liquids. Furthermore, under the effect of the compression, the ring-shaped packing members are applied against the ball element as well as against the inner walls of the case, which ensures perfect fluid tightness.

Other features of the present invention will result from the following detailed description of some specific embodiments thereof.

Preferred embodiments of the present invention will be hereinafter described, with reference to the accompanying drawing, given merely by way of example, and in which:

Fig. 1 is a longitudinal section of the swivel assembly device for two fluid pipe systems, the section plane passing through the axes of said pipe systems;

Fig. 2 is a sectional view on the line II—II of Fig. 1;

Fig. 3 is a sectional view on the line III—III of Fig. 2.

In Figs. 1 to 3, I have shown the assembly device according to the invention as applied, in its preferred embodiment, to the coupling of pipe elements for conveying a fluid, for instance steam. One of the pipe elements, not shown on the drawing, is adapted to be screwed to a coupling member 1, for instance owing to the provision of a threaded part 2. The other pipe element (or an intermediate coupling element) is shown at 3. Element 1 is provided at its end with a spherical ball 4, open at 5 and adapted to work inside a casing 6 consisting of a socket fixed to pipe 3 by screwing at 7, with soldering at 28. Portion 1 can as well revolve with respect to portion 3 as be given a different direction with respect thereto.

In socket 6 there is provided, near the end thereof, a threaded portion 8 intended to receive a nut 9 provided with outer threads and the inner hole of which is castellated, as shown at 10. This nut constitutes an end ring or backing member against which is applied a ring-shaped member 11, acting as packing element. This ring member 11 is preferably made of a single piece so as to be better adapted to play the part of packing element. Preferably, it is made of a relatively plastic and compressible material, such as compressed asbestos. In some cases, it may be metallic or again be made of another material which is little compressible or not compressible at all, such as coal. Member 11 is provided at 12 with a spherical bearing surface. Ball 4 is applied against ring member 11 by means of a ring-member 13 provided inwardly with a spherical bearing surface. Externally, ring member 13 is provided with a frusto-conical bearing surface 15, and it must be capable of shrinking. For this reason, it is made of a material having a certain plasticity, such as asbestos, in which case it can serve, together with packing member 11, to ensure fluid tightness. It may be made of metal or another material which is not deformable, such as coal, and in this case it is split at one or several places, consisting in some cases of a series of segments. When this ring member is to ensure fluid tightness, the adjoining ends of the ring or the adjoining faces of the segments must be assembled in the manner of piston packing rings or with labyrinth joints.

The continuous, or possibly discontinuous, ring member 13 is pressed against the flaring frusto-conical mouth of sleeve 6 through a ring 16 which, in the example shown in the drawing, can be driven by means of nuts 17 screwing on studs 18.

Socket 6 is provided, opposite the threaded portion 8, with a port or aperture 19 permitting the insertion of a tool having a pointed end for operating nut 9. On the other hand, said nut is provided, at close intervals, with radial holes 20. Port 19 can be covered by a plate or lid 21 through which pass studs 22 secured to member 6 and having nuts screwed thereon for applying plate 21 against an intervening packing element which, in the embodiment shown by the drawing, consists of a metallo-plastic ring 23 completed by a washer 24 which surrounds it. In order to avoid, in service, an accidental unscrewing of nut 9, the latter is provided with a locking member. In the example illustrated by the drawing, this locking member consists of a rod 25 the end of which is engaged in one of the holes 20, whereas the other end of said rod penetrates into a hole 26 of a boss 27 provided on the inner face of plate 21.

In order to assemble together the two parts of the pipe system, I proceed in the following manner:

Plate 21 having been removed, I introduce from the right hand side nut 9 and I screw it in the threaded hole 8. I then introduce ring-member 11, I put ball 4 in position, I introduce ring-shaped element 13, either in the form of separate segments, or after having previously slipped it around the tubular part 1 prior to the screwing of the right hand side portion of the pipe system with coupling element 1. I set plate 16 in position and I fix it by means of bolts upon socket 6. In order to finish the adjustment and to exactly obtain the required degree of tightening, I turn nut 9 by a pointed tool, and, once this adjustment is finished, I fix said plate in position by inserting locking member 25 into one of the holes 20 and securing it by plate 21, after having fixed the packing means in position.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a flexible coupling device for conduits, the combination of an internally screw-threaded socket for a ball, having in its wall an aperture opening in the screw-threaded part; an externally screw-threaded backing plate for said ball having a thickness larger than the aperture, positioned within the socket in operative engagement through its screwthreaded part with the screw-threaded part of the socket so as to fully cover said aperture, the plate having peripheral recesses spaced apart from the faces of the plate; and removable means attached to the socket for sealing the aperture on the outer side thereof.

2. In a flexible coupling device for conduits, the combination of an internally screw-threaded-socket for a ball, having in its wall an aperture opening in the screw-threaded part; an externally screw-threaded backing plate for said ball having a thickness larger than the aperture, positioned within the socket in operative engagement through its screw-threaded part with the screw-threaded part of the socket so as to fully cover said aperture, the plate having peripheral recesses spaced apart from the faces of the plate; and removable means attached to the socket for locking the plate against rotation and sealing the aperture on the outer side thereof.

ETTORE BUGATTI.